United States Patent [19]

Perrin

[11] Patent Number: 5,087,684
[45] Date of Patent: Feb. 11, 1992

[54] CURABLE KETIMINOXY/ORGANOPOLYSILOXANE COMPOSITIONS DEVOID OF ORGANOMETALLIC CURING CATALYSTS

[75] Inventor: Patrice Perrin, Lyon, France

[73] Assignee: Rhone-Poulenc Chimie, Courbevoie, France

[21] Appl. No.: 661,296

[22] Filed: Feb. 27, 1991

[30] Foreign Application Priority Data

Feb. 27, 1990 [FR] France .................. 90 02697

[51] Int. Cl.$^5$ ............................................. C08G 77/06
[52] U.S. Cl. ................................. 528/22; 523/213; 524/863; 528/21
[58] Field of Search ............... 523/213; 524/863; 528/21, 22

[56] References Cited

U.S. PATENT DOCUMENTS

| | | | |
|---|---|---|---|
| 3,417,120 | 12/1968 | Boissieras et al. | 528/21 |
| 3,560,442 | 2/1971 | Golitz et al. | 528/22 |
| 3,770,847 | 11/1973 | Lengnick et al. | 260/827 |
| 4,525,565 | 6/1985 | Laisney et al. | 524/863 |
| 4,786,702 | 11/1988 | Sam et al. | 528/22 |
| 4,973,623 | 11/1990 | Haugsby et al. | 524/863 |

FOREIGN PATENT DOCUMENTS

| | | |
|---|---|---|
| 0050453 | 4/1982 | European Pat. Off. |
| 0070786 | 1/1983 | European Pat. Off. |
| 0208963 | 1/1987 | European Pat. Off. |
| 0340120 | 11/1989 | European Pat. Off. |

*Primary Examiner*—Paul R. Michl
*Assistant Examiner*—Karen A. Hellender
*Attorney, Agent, or Firm*—Burns, Doane, Swecker & Mathis

[57] ABSTRACT

Novel organopolysiloxane compositions that are storage-stable in the absence of moisture, but curable into elastomeric state in the presence of moisture, nonetheless devoid of any organometallic curing catalyst, include (A) an $\alpha,\omega$-dihydroxydiorganopolysiloxane oil, (B) a ketiminoxysilane crosslinking agent, (C) inorganic filler material, (D) an organofunctional silane and (E) a substituted hydroxylamine; the crosslinked elastomers produced from these organopolysiloxane compositions are well adopted for such applications as foodstuff packaging, medical bandaging and antifouling/antisoiling coatings.

9 Claims, No Drawings

CURABLE KETIMINOXY/ORGANOPOLYSILOXANE COMPOSITIONS DEVOID OF ORGANOMETALLIC CURING CATALYSTS

BACKGROUND OF THE INVENTION

1. Field of the Invention

The present invention relates to novel organopolysiloxane compositions that are stable in storage in the absence of moisture, but curable into elastomeric state in the presence of moisture, and which comprise, as the essential constituents thereof, an $\alpha,\omega$-dihydroxydiorganopolysiloxane polymer, a ketiminoxysilane crosslinking agent and an inorganic filler material; such novel compositions properly crosslink into elastomeric state in the absence of any organometallic curing catalyst.

2. Description of the Prior Art

Single-component organopolysiloxane compositions containing a ketiminoxysilane crosslinking agent, typically also comprising an inorganic filler and a curing catalyst, have long been known to this art. They are described, for example, in French Patents FR-A-1,314,649, FR-A-1,371,250, in U.S. Pat. Nos. 3,678,003 and 3,986,999, in British Patent GB-A-1,468,467, in Belgian Patent BE-A-901,479 and in European Patent EP-A-157,580.

These compositions are employed especially for coating and sealing applications, and in particular as sealants in the construction industry for producing glazed structures.

They can also be employed in the form of dispersions in organic diluents for producing various coatings.

It is also known, furthermore, from FR-A-2,074,144, to add an aminofunctional silane to such type of composition. In addition, the incorporation of hydroxylamine in silicone compositions containing an alkoxysilane crosslinking agent has been described, for example, in EP-A-70,786, and U.S. Pat. Nos. 3,770,847 and 3,847,848.

For certain special applications such as foodcontact applications, medical applications and "antifouling" (antisoiling) coating applications, a need exists in this art for compositions of the above type which can crosslink without any organometallic catalyst, in particular in the absence of any organotin compound.

Another reason for avoiding such organotin compound is because compositions of the above type very often contain an organopolyalkoxysilane which bears a primary amine functional group; it is known to this art (see, for example, EP-A-184,966 and EP-A-267,126) that the silane/tin pair adversely affects the storage stability of such compositions.

SUMMARY OF THE INVENTION

Accordingly, a major object of the present invention is the provision of improved storage-stable organopolysiloxane compositions that are not only crosslinkable into elastomeric state even in the absence of any organometallic curing catalyst, but which also exhibit setting rates and mechanical and adhesive properties which are at least as good as those of the known organopolysiloxanes cured by means of an organometallic curing catalyst.

Briefly, the present invention features novel organopolysiloxane compositions that are stable in storage in the absence of moisture and curable into elastomers in the presence of moisture, comprising:

(A) 100 parts by weight of at least one $\alpha,\omega$-dihydroxydiorganopolysiloxane polymer having a viscosity of 700 to 1,000,000 mPa.s at 25° C., which comprises diorganosiloxy recurring units of the formula $R_2SiO$, in which the radicals R, which may be identical or different, are each a hydrocarbon radical having from 1 to 10 carbon atoms, at least 50% of the number of such radicals R being methyl radicals;

(B) 0.5 to 20 parts by weight of at least one crosslinking agent comprising at least one ketiminoxysilane;

(C) 1 to 250 parts by weight of an inorganic filler material;

(D) 0.1 to 10 parts by weight of an organofunctional silane of the formula:

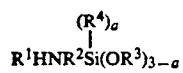

(1)

in which $R^1$ is a hydrogen atom, an alkyl radical having from 1 to 6 carbon atoms, inclusive, or an aliphatic hydrocarbon radical bonded via a carbon bond to the nitrogen atom and containing at least one primary amine group, $R^2$ is a divalent hydrocarbon radical having from 1 to 6 carbon atoms, optionally containing an ether functional group, $R^3$ is an alkyl or alkoxyalkyl radical having less than 8 carbon atoms, $R^4$ is a monovalent hydrocarbon radical having from 1 to 6 carbon atoms, a phenyl radical or a vinyl radical and $a$ is 0 or 1; and (E) 0.001 to 1 part by weight of a hydroxylamine of the formula:

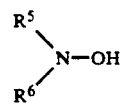

(2)

in which the radical $R^5$ is a saturated or unsaturated, aliphatic or cycloaliphatic, monovalent hydrocarbon, or aryl, alkylaryl or arylalkyl radical, and the radical $R^6$ is a radical $R^5$ or a hydrogen atom, with the proviso that two of the radicals $R^5$ and $R^6$ may together form a divalent radical containing an O, N or Si heteroatom and having from 2 to 6 carbon atoms; such compositions are conspicuously devoid of any organometallic curing catalyst.

DETAILED DESCRIPTION OF THE PREFERRED EMBODIMENTS OF THE INVENTION

More particularly according to the present invention, the $\alpha,\omega$-di(hydroxy)diorganopolysiloxane polymers (A) having a viscosity of 700 to 1,000,000 mPa.s at 25° C., preferably 1,000 to 700,000 mPa.s at 25° C., are advantageously linear polymers consisting essentially of diorganosiloxy recurring units of the formula $R_2SiO$ and blocked by a hydroxyl group at each end of their polymer chains; however, the presence of monoorganosiloxy recurring units of the formula $RSiO_{1.5}$ and/or siloxy recurring units of the formula $SiO_2$ is not excluded, in a proportion not exceeding 2% relative to the number of diorganosiloxy units.

The hydrocarbon radicals having from 1 to 10 carbon atoms, whether or not substituted by halogen atoms or cyano groups, represented by the symbols R, include:

(i) alkyl and haloalkyl radicals having from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals;

(ii) cycloalkyl and halocycloalkyl radicals having from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(iii) alkenyl radicals having from 2 to 4 carbon atoms, such as vinyl, allyl and 2-butenyl radicals;

(iv) mononuclear aryl and haloaryl radicals having from 6 to 10 carbon atoms, such as phenyl, tolyl, xylyl, chlorophenyl, dichlorophenyl and trichlorophenyl radicals;

(v) cyanoalkyl radicals, the alkyl moiety of which has from 2 to 3 carbon atoms, such as $\beta$-cyanoethyl and $\gamma$-cyanopropyl radicals. The methyl, phenyl, vinyl and 3,3,3-trifluoropropyl radicals are the preferred.

Exemplary recurring units of the formula $R^2SiO$ include:

$(CH_3)_2SiO$,
$CH_3(CH_2=CH)SiO$,
$(CH_3)(C_6H_5)SiO$,
$(C_6H_5)_2SiO$,
$CF_3CH_2CH_2(CH_3)SiO$,
$NC-CH_2CH_2(CH_3)SiO$,
$NC-CH(CH_3)CH_2(CH_2=CH)SiO$,
$NC-CH_2CH_2CH_2(C_6H_5)SiO$.

It should be appreciated that the polymer (A) may be a mixture of $\alpha,\omega$-di(hydroxy)diorganopolysiloxane polymers which differ from each other in molecular weights and/or the nature of the groups bonded to the silicon atoms.

These $\alpha,\omega$-di(hydroxy)diorganopolysiloxane polymers (A) are commercially available; in addition, they can be easily prepared according to techniques which are now well known to this art. It is desirable to employ these polymers after they have been devolatilized, for example using the devolatilization process described in U.S. Pat. No. 4,356,116.

The crosslinking agents (B) are employed in a proportion of 0.5 to 20 parts by weight, preferably 1 to 18 parts by weight, per 100 parts by weight of $\alpha,\omega$-di(hydroxy)diorganopolysiloxane polymers (A). These are organosilicon compounds bearing at least two hydrolyzable ketiminoxy radicals per molecule, which are bonded to the silicon atoms.

The crosslinking agent (B) preferably has the general formula:

$$Y^1{}_f Si Z^1{}_{(4-f)}$$

in which the symbol $Y^1$ is a $C_1$-$C_{10}$ hydrocarbon radical, or such hydrocarbon radical substituted by halogen atoms or cyano groups, the symbols $Z^1$, which may be identical or different, are each a hydrolyzable radical of one of the formulae:

$$Z^2{}_2C=NO, E^1 \boxed{\phantom{xx}} C=NO-,$$

in which the symbols $Z^2$, which may be identical or different, are $C_1$-$C_8$ hydrocarbon radicals, and the symbol $E^1$ is a $C_4$-$C_8$ alkylene radical, and the symbol f is zero or one.

The symbol $Y^1$ may have the same definition as the symbol R of the above units of formula $R_2SiO$; thus, the examples of R also apply to $Y^1$.

The symbols $Z^2$ are $C_1$-$C_8$ hydrocarbon radicals including, especially:

(i) $C_1$-$C_8$ alkyl radicals such as methyl, ethyl, propyl, isopropyl, butyl, isobutyl, 2-ethylhexyl or octyl radicals;

(ii) $C_5$-$C_8$ cycloalkyl radicals such as cyclopentyl, cyclohexyl and methylcyclohexyl radicals;

(iii) mononuclear $C_6$-$C_8$ aryl radicals such as phenyl, tolyl or xylyl radicals.

The symbol $E^1$ is a $C_4$-$C_8$ alkylene radical which may correspond to the formulae: $-(CH_2)_4-$, $-(CH_2)_5-$, $-(CH_2)_6-$, $-(CH_2)_7-$, $-CH_2-CH_2(C_2H_5)(CH_2)_3-$, $-CH_2-CH_2-CH(CH_3)CH_2CH_2$.

Exemplary of the silanes (B), particularly representative are the silanes of the formulae:
$CH_3Si[ON=C(CH_3)_2]_3$, $CH_3Si[ON=C(CH_3)C_2H_5]_3$,
$CH_2=CHSi[ON=C(CH_3)C_2H_5]_3$,
$C_6H_5SiON[=C(CH_3)_2]_3$,
$CH_3Si[ON=C(C_2H_5)(CH_2)_3CH_3]_2$,
$(CH_3)_2C=NOSi[ON=C(CH_3)C_2H_5]_3$, $$CH_3Si[ON=C\boxed{\phantom{xx}(CH_2)_4}]_3$$

$$CH_3Si[ON=C\boxed{\phantom{xx}(CH_2)_5}]_3$$

$Si[ON=C(C_2H_5)(CH_3)]_4$.

It is more particularly preferred to incorporate the following silanes:
vinyltris(methyl ethyl ketoxime)silane: $(CH_2=CH)Si[ON=C(CH_3)(C_2H_5)]_3$
methyltris(methyl ethyl ketoxime)silane: $CH_3Si[ON=C(CH_3)(C_2H_5)]_3$
tetrakis(dimethyl ketoxime)silane: $Si[ON=C(CH_3)_2]_4$
tetrakis (methyl ethyl ketoxime) silane: $Si[ON=C(C_2H_5)(CH_3)]_4$
and mixtures thereof.

The inorganic fillers (C) are incorporated in a proportion of 1 to 250 parts by weight, preferably 20 to 200 parts by weight per 100 parts by weight of $\alpha,\omega$-di(hydroxy)diorganopolysiloxane polymers (A).

These fillers may be in the form of very finely divided materials whose mean particle diameter is less than 0.1 micrometer. Such fillers include pyrogenic silicas and precipitated silicas; their BET specific surface area is generally greater than 40 m$^2$/g.

These fillers may also be in the form of more coarsely divided materials, having a mean particle diameter greater than 0.1 micrometer. Exemplary thereof are ground quartz, diatomaceous silicas, treated or untreated calcium carbonate, calcined clay, titanium dioxide of rutile type, iron, zinc, chromium, zirconium and magnesium oxides, the various forms of alumina (hydrated or otherwise), boron nitride, lithopone, barium metaborate, barium sulfate and ballotini; their specific surface area is typically less than 30 m$^2$/g.

These fillers (C) may have been surface-modified by treatment with the various organosilicon compounds usually employed for such purpose. Thus, these organosilicon compounds may be organochlorosilanes, diorganocyclopolysiloxanes, hexaorganodisiloxanes, hexaorganodisilazanes or diorganocyclopolysiloxanes (French Patents FR-A-1,126,884, FR-A-1,136,885, FR-A-1,236,505 and British Patent GB-A-1,024,234). In most cases, the treated fillers contain from 3% to 30% of their weight of organosilicon compounds.

The fillers (C) may be a mixture of a number of types of fillers of different particle size; thus, for example, they may include 5% to 95% of finely divided silicas having a BET specific surface area greater than 40 m²/g and of 95% to 5% of more coarsely divided silicas of specific surface less than 30 m²/g, or of treated or untreated calcium carbonate.

From 1 to 50 parts by weight of siliceous fillers selected from among precipitated silicas and pyrogenic silicas treated with an organosilicon compound are preferably employed, more particularly in the case where the compositions according to the invention are dispersed in an organic diluent. From 2 to 10 parts by weight of siliceous fillers are then preferably employed.

Among the organofunctional silanes (D) of formula (1), particularly preferred are the silanes of the formulae: $(CH_3O)_3Si(CH_2)_3NH(CH_2)_2NH_2$; $(CH_3OCH_2CH_2O)_3Si(CH_2)_2NH_2$; $(C_2H_5O)_3Si(CH_2)_3NH_2$; $(CH_3OCH_2CH_2O)_3Si(CH_2)_3NH_2$; $(C_2H_5O)_3Si(CH_2)_3O(CH_2)_3NH_2$; $(C_2H_5O)_2C_6H_5Si(CH_2)_3O(CH_2)_3NH_2$; $(C_2H_5O)_3SiCH_2O(CH_2)_2NH_2$; $(C_2H_5O)_3Si(CH_2)_3O(CH_2)_2NH_2$; $(C_2H_5O)_2CH_3Si(CH_2)_3NH_2$.

Organofunctional silanes (D) which are even more preferred include:
$(C_2H_5O)_3Si(CH_2)_3NH_2$,
τ-aminopropyltriethoxysilane,
$(CH_3O)_3Si(CH_2)_3NH_2$,
τ-aminopropyltrimethoxysilane,
$(CH_3O)_3Si(CH_2)_3NH(CH_2)_2NH_2$,
β-aminoethyl-τ-aminopropyltrimethoxysilane.

From 0.1 to 10, preferably from 0.5 to 5 parts by weight of silane (D) per 100 parts by weight of oil (A) are advantageously incorporated.

The substituted hydroxylamines (E) in the subject compositions have the general formula:

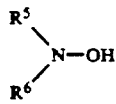 (2)

in which the radical $R^5$ is a saturated or unsaturated, aliphatic or cycloaliphatic monovalent hydrocarbon or aryl, alkylaryl or arylalkyl radical. The radical $R^6$ has the same definition as the radical $R^5$ and may additionally be a hydrogen atom. In general, the radicals $R^5$ and $R^6$ typically have not more than 10 carbon atoms. If desired, the two radicals $R^5$ and $R^6$ may together form a saturated or unsaturated divalent radical optionally containing a heteroatom and having from 2 to 6 atoms. It will be appreciated that, in this instance, saturated or unsaturated heterocyclic rings are formed, which will be referred to by the expression "substituted cyclic hydroxylamine". These heterocyclic rings may contain another nitrogen atom or an oxygen atom or a silicon atom.

The radicals $R^5$ and $R^6$ preferably are alkyl radicals having, at most, 4 carbon atoms, or phenyl radicals.

Substituted hydroxylamines which have identical groups $R^5$ and $R^6$ are advantageously employed.

Exemplary of the various acyclic hydroxylamines, the following are representative:
N-dimethylhydroxylamine
N-diethylhydroxylamine
N-dibutylhydroxylamine
N-methyl-N-phenylhydroxylamine
N-diphenylhydroxylamine.
N-hydroxymorpholine, N-hydroxypiperidine and N-hydroxypyrrolidine are exemplary of the "substituted cyclic hydroxylamines".

The substituted hydroxylamine is incorporated in a catalytically effective amount such that it constitutes, by weight, 0.001 to 1 part, preferably from 0.01 to 0.5 part, per 100 parts of hydroxylated oil (A).

The preferred hydroxylamines are:
N-dimethylhydroxylamine
N-diethylhydroxylamine
N-dibutylhydroxylamine
N-methyl-N-phenylhydroxylamine
N-diphenylhydroxylamine.

In accordance with the present invention, it has now unexpectedly been shown that it is possible to replace the organometallic curing catalyst (generally, an organotin salt or an organotitanate) by the combination of aminofunctional silane (D) and the hydroxylamine (E). (E) and (D) must necessarily be employed together to provide a suitable cure similar to the cure effected using an organotin salt. It has thus also been found that the use of the hydroxylamine by itself, without silane (D), results in an insufficient curing rate.

More particularly in the case where the compositions are employed dispersed in organic diluents to produce "antifouling" (antisoiling) coatings as explained in greater detail below, the compositions according to the invention additionally comprise 1 to 15 parts by weight of at least one oil (F) of the formula:

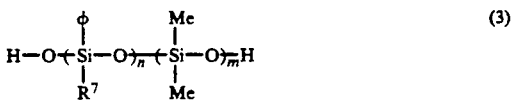 (3)

in which φ is a phenyl radical, Me is a methyl radical, the radicals $R^7$, which may be identical or different, are each a methyl or phenyl radical, n is an integer ranging from 2 to 100, inclusive, m is an integer ranging from 0 to 100, and n and m are furthermore additionally selected such that the viscosity of the oil at 25° C. ranges from 50 to 100,000 mPa.s.

In addition to the constituents (A) to (F) described above, the compositions according to the invention may include other constituents.

These constituents include organosilicon compounds, principally polymers which are capable of favorably affecting the physical characteristics of the compositions of the invention and/or the mechanical properties of the silicone elastomers produced from such compositions, incorporated in a proportion of 1 to 150 parts by weight per 100 parts by weight of (A).

These compounds are well known to this art and are usually designated plasticizers; they include, for example:

(i) α,ω-bis(trimethylsiloxy)dimethylpolysiloxane polymers having a viscosity of at least 10 mPa.s at 25° C.; α,ω-bis(trimethylsiloxy)dimethylpolysiloxane oils having a viscosity of 10 mPa.s at 25° C. to 1,500 mPa.s at 25° C. are preferably employed;

(ii) liquid, branched methylpolysiloxane polymers containing from 0.1% to 8% of hydroxyl groups bonded to the silicon atoms, comprising the units $(CH_3)_3SiO_{0.5}$, $(CH_3)_2SiO$ and $CH_3SiO_{1.5}$ distributed such as to provide a $(CH_3)_3SiO_{0.5}/(CH_3)_2SiO$ ratio of 0.01 to 0.15 and a $CH_3SiO_{1.5}/(CH_3)_3SiO$ ratio of 0.1 to 1.5;

(iii) $\alpha,\omega$-di(hydroxy)dimethylpolysiloxane oils having a viscosity of 10 to 300 mPa.s at 25° C. and $\alpha,\omega$-di(hydroxy)methylphenylpolysiloxane oils having a viscosity of 200 to 1,000 mPa.s at 25° C.;

(iv) diphenylsilanediol and 1,1,3,3-tetramethyldisiloxanediol.

The above diorganopolysiloxane polymers may be completely or partially replaced by organic compounds which are inert in respect of the various constituents of the bases and are miscible at least with the diorganopolysiloxane polymers (A).

Exemplary organic plasticizers are, in particular, petroleum cuts having a boiling point higher than 200° C., e.g., a mixture of aliphatic and/or aromatic hydrocarbons, polybutylenes, preferably of low molecular weight, such as described in French Patents FR-A-2,254,231, FR-A-2,293,831 and FR-A-2,405,985, the products of alkylation of benzene, in particular the polyalkylbenzenes produced by alkylation of benzene with olefins having a long linear or branched chain, in particular olefins having 12 carbon atoms, emanating from the polymerization of propylene, such as described, for example, in French Patent FR-A-244,649.

It is also possible to incorporate mixed organic polydiorganopolysiloxane polymers such as polyorganopolysiloxane copolymers containing polyoxyalkylene blocks, phosphoric esters (FR-A-2,372,203), trioctyl phosphate (FR-A-2,415,132) and dialcoholic esters of dicarboxylic acids (U.S. Pat. No. 2,938,007).

Benzene alkylation products having a molecular weight higher than 200, in particular alkylbenzenes and polyalkylbenzenes are the preferred organic plasticizers.

Nonorganosilicon constituents may also be introduced, for example heat stabilizers. These compounds improve the heat resistance of the ultimate silicone elastomers. Exemplary thereof are salts of carboxylic acids, rare-earth oxides and hydroxides, and more especially ceric oxides and hydroxides, as well as pyrogenic titanium dioxide and the various iron oxides. From 0 1 to 15 parts by weight, preferably from 0.15 to 12 parts by weight of heat stabilizers are advantageously employed per 100 parts by weight of diorganopolysiloxanes (A).

To formulate the compositions of the invention, it is necessary, in the case of single-component compositions, to employ an apparatus which permits the various essential constituents to be blended while protected against moisture, with and without heat input, the aforementioned adjuvants and additives being added thereto, if desired.

All of these constituents may be charged into the apparatus in any order of addition. Thus, it is possible to first mix the diorganopolysiloxane polymers (A) and optionally (F), the aminofunctional silane (D) and the fillers (C), and then to add the crosslinking agents (B) and the hydroxylamine (E) to the resulting paste.

It is also possible to mix the polymers (A) and optionally (F) and the crosslinking agents (B) and to add the fillers (C), the adhesion silane (D) and the hydroxylamine (E) subsequently. During these operations, the mixtures may be heated to a temperature in the range of 50° to 180° C. at atmospheric pressure or at a reduced pressure, in order to promote the removal of volatile materials therefrom, such as water or polymers of low molecular weight.

The compositions of the invention may be employed for many applications, such as sealing in the construction industry, the assembling of the widest variety of materials (metals, plastics, natural and synthetic rubbers, wood, cardboard, earthenware, brick, ceramic, glass, stone, concrete, masonry components), the insulation of electrical conductors, the coating of electronic circuits and the preparation of molds used for the manufacture of shaped articles of synthetic resins or foams.

If desired, the compositions according to the invention may be employed after dilution in liquid organic compounds; the diluents are preferably ordinary commercial products selected from among:

(i) aliphatic, cycloaliphatic and aromatic hydrocarbons, halogenated or otherwise, such as n-heptane, noctane, cyclohexane, methylcyclohexane, toluene, xylene, mesitylene, cumene, tetralin, perchloroethylene, trichloroethane, tetrachloroethane, chlorobenzene and ortho-dichlorobenzene.

The amount of diluent generally remains of little importance; it typically ranges from 20 to 150 parts by weight of diluent per 100 parts by weight of composition.

The aforementioned dilutions of these compositions in organic diluents can be employed more especially for impregnating woven or nonwoven articles as thin layers, and for coating metal, plastic or cellulose-based sheets; however, they can be sprayed, for example by atomizing using a spray gun, onto any substrates, on which it is necessary to produce a coating having a thickness on the order to 5 to 300 $\mu$m. After spraying the solutions, the diluents evaporate off and the resulting compositions cure to a perfectly uniform rubbery film.

The curing time usually ranges from 5 minutes to several hours, not exceeding 10 hours; this time depends on factors referred to above in connection with the curing time of the compositions deposited as thicker layers and also on the rate at which the diluents evaporate off. This technique of deposition by spraying is very practical for coating very large areas with a thin film and more especially the hulls of ships and nets for breeding aquatic animals and, generally, any surface immersed in fresh water or seawater. The deposition of an antiadhesive silicone film onto surfaces of boats in contact with seawater prevents the fouling of these surfaces due to the attachment and the development of marine organisms such as algae, barnacles, oysters or ascidians; this antifouling application is described, for example, in U.S. Pat. No. 3,702,778.

To improve the antifouling effect, it is recommended to add at least one of the following additives to the dispersions according to the invention:

(i) a liquid hydrocarbon compound, for example a polyolefin, a plasticizer or a lubricating oil (FR-A-2,375,305);

(ii) liquid paraffins and waxy materials of the petrolatum type (Kokai JP-A-83/013,673);

(iii) a thermoplastic polymer such as PVC or a vinyl chloride/vinyl acetate copolymer (Kokai JP-A-79/026,826).

(iv) fluorescent substances (EP-A-63,388);

(v) cationic, anionic, nonionic or amphoteric surfactants (Kokai JP-A-85/258,271).

Furthermore, this elastomer film can be used as an inert, nontoxic, antiadherent coating for various substrates in contact with food products such as (1) wrapping papers for confectionery or deep-frozen meats, (2) metal troughs which can be employed for the preparation of ice creams and sorbets and (3) metal nets in which bread dough is deposited and molded and which are introduced with their contents into the ovens for baking bread. It can also be employed as an antiadhesive and nontoxic coating for materials in contact with the human body, such as compresses and special burn dressings.

In order to further illustrate the present invention and the advantages thereof, the following specific examples are given, it being understood that same are intended only as illustrate and in nowise limitative.

In said examples to follow, all parts and percentages are given by weight, unless otherwise indicated.

EXAMPLES 1 AND 2 AND COMPARATIVE EXAMPLE 3

Various raw materials employed $A_1$: α,ω-dihydroxypolydimethylsiloxane oil having a viscosity of 70,000 mPa.s at 25° C.;

$A_2$: oil identical to $A_1$, but having a viscosity of 3,500 mPa.s at 25° C.;

$P_1$: alkylated heavy residue originating from the alkylation of benzene with tetrapropylene and marketed by the Petrosynthese Company under the trademark alkylate 150 DT ®;

$P_2$: α,ω-trimethylsilyl-blocked polydimethylsiloxane oil having a viscosity of 1,000 mPa.s at 25° C.;

$B_1$: methyltris(methyl ethyl ketiminoxy)silane;

$B_2$: vinyltris(methyl ethyl ketiminoxy)silane;

$C_1$: pyrogenic silica having a specific surface area of 150 m$^2$/g;

$C_2$: treated hydrophobic pyrogenic silica having a specific surface area of 260 m$^2$/g;

$C_3$: ground quartz having a mean particle size of 5 μm;

$C_4$: TiO$_2$ powder;

$C_5$: precipitated calcium carbonate having a mean particle size of 0.070 μm treated with stearic acid;

$D_1$: di-n-butyltin bis(acetylacetonate);

$D_2$: di-n-butyltin dilaurate;

$D_3$: β-aminoethyl-γ-aminopropyltrimethoxysilane;

$D_4$: diethylhydroxylamine;

$D_5$: 50/50 mixture of tetramethylguanidine and of a fatty amine;

$F_1$: α,ω-dihydroxypoly(dimethyl)(diphenyl)siloxane oil having a viscosity of 25,000 mPa.s at 25° C. and containing 13% by weight of diphenylsiloxy units.

Preparation of a transparent nonflowing composition

The oil A, the plasticizer P, the pyrogenic silica C, and optionally another filler C were introduced in succession into a mixer equipped with a three-bladed stirrer and under nitrogen purging and the entire mass was homogenized for 5 minutes at 450 revolutions/min. The catalyst D was then added, diluted in a little oil $P_2$. The silane $D_5$ was added next, stirring was carried out for 1 minute at 250 revolutions/min and then, while stirring was continued, the pressure in the mixer was decreased to an absolute pressure of 3 kPa. After degassing at reduced pressure for 5 minutes, nitrogen was introduced until atmospheric pressure was attained. The composition was then transferred into cartridges which were impervious to atmospheric moisture.

Measurement of Physical Properties

The pourability of the composition was measured (in mm) according to the Boeing test.

Extrusion was assessed in g/minute by measuring the rate of flow of a composition extruded under a pressure of 2 bars through a calibrated nozzle having an internal diameter of 5.7 mm.

A composition was subjected to accelerated aging by subjecting cartridges to a temperature of 70° C. for 7 days and the appearance of the product was observed.

To determine the ability of this composition to cure rapidly into an elastomer in the surrounding air, it was spread with the aid of a doctor blade into a layer 2 mm in thickness on a polyethylene sheet pretreated with a commercial anionic surface-active agent; this agent was the sodium salt of an alkyl sulfate in which the alkyl group was branched and contained at least 12 carbon atoms.

The period of time, at the end of which the surface of the deposited layer was nonadhesive, was noted. This measurement was performed using a wooden rod which was brought into contact via one of its two ends with the surface of the deposited layer; it was determined whether a significant adhesiveness existed between the rod and the layer. This measurement will be designated "nonadhesive time" (t in minutes), indicated in Table I below.

The following were measured on the 7-day-old film:

(a) the Shore A hardness (SAH) according to NF Standard T-51,109;

(b) the tensile strength (T/S) in MPa according to NF Standard T-46,002;

(c) the elongation at break (E/B) in % according to NF Standard T-46,002;

(d) the secant modulus (SM) in MPa at an elongation of 100%.

The results obtained are reported in Table I below.

The nature and the content of the various constituents of the compositions of the examples and their physical properties are also reported in Table I below:

TABLE I

| Examples | 1 | 2 | 3 |
| --- | --- | --- | --- |
| $A_1$ parts by weight | 60 | 60 | 60 |
| $A_2$ parts by weight | 40 | 40 | 40 |
| $P_1$ parts by weight | 26 | 26 | 26 |
| $B_1$ parts by weight | 8 | 4 | 4 |
| $B_2$ parts by weight | 0 | 4 | 4 |
| $C_1$ parts by weight | 12 | 12 | 12 |
| $D_2$ parts by weight | 0 | 0 | 0.5 |
| $D_3$ parts by weight | 1 | 1 | 1 |
| $D_4$ parts by weight | 0.2 | 0.2 | 0 |
| Pourability (min) | 0 | 0 | 0 |
| Extrusion g/minute | 660 | 560 | 500 |
| t (minute) | 7 | 7 | 6 |
| Accelerated aging | normal | normal | solidification |
| Shore A hardness | 25 | 24 | 25 |
| Y.M 100% (MPa) | 0.5 | 0.6 | 0.5 |
| T/S (MPa) | 1.6 | 1.6 | 1.5 | 1.4 |
| E/B % | 430 | 300 | 290 |

From Table I, it will be seen that the compositions according to the invention were stable in storage and properly crosslinked into an elastomer which had mechanical properties comparable to a composition of the same type, catalyzed with tin but which was found not to be stable in storage.

EXAMPLES 4, 5 AND COMPARATIVE EXAMPLES 6 AND 7

Opaque (white) nonpouring composition:

A nonpouring composition additionally containing calcium carbonate was produced according to the operating procedure of Example 1.

The various constituents of the compositions, their respective contents and their physical properties are reported in Table II below.

From Table II, it will be seen that the composition of Comparative Example 6, where diethylhydroxylamine had been replaced by another amine, was in fact pouring and exhibited a tack-free time (t) which was too long.

Furthermore, the compositions of the invention of Examples 4 and 5 exhibited physical properties which were wholly comparable with the composition of Comparative Example 7, catalyzed with tin.

TABLE II

| Examples | 4 | 5 | 6 | 7 |
|---|---|---|---|---|
| $A_1$ parts by weight | 60 | 60 | 60 | 60 |
| $A_2$ parts by weight | 40 | 40 | 40 | 40 |
| $P_1$ parts by weight | 26 | 26 | 26 | 26 |
| $B_1$ parts by weight | 8 | 8 | 8 | 8 |
| $B_2$ parts by weight | 0 | 0 | 0 | 0 |
| $C_1$ parts by weight | 12 | 12 | 12 | 12 |
| $C_5$ parts by weight | 160 | 160 | 160 | 160 |
| $D_2$ parts by weight | 0 | 0 | 0 | 0.5 |
| $D_3$ parts by weight | 1 | 1 | 1 | 1 |
| $D_4$ parts by weight | 0.2 | 0.4 | 0 | 0 |
| $D_5$ parts by weight | 0 | 0 | 2 | 0 |
| Pourability (min) | 1 | 2 | 10 | 1 |
| Extrusion g/minute | 900 | 750 | 800 | 780 |
| t (minute) | 30 | 12 | 60 | 12 |
| Accelerated aging | normal | normal | almost normal | normal |
| Shore A hardness | 26 | 30 | 20 | 22 |
| Y.M 100% (MPa) | 0.5 | 0.6 | 0.4 | 0.3 |
| T/S (MPa) | 0.7 | 0.8 | 1 | 0.9 |
| E/B % | 320 | 270 | 450 | 340 |

EXAMPLE 8 AND COMPARATIVE EXAMPLES 9 AND 10

Pouring composition without hydroxylated phenylated oil.

Preparation

The oils A, the plasticizer P and the fillers C were introduced in succession into a mixer equipped with three-bladed stirring and under nitrogen purging, beginning with the finest filler and ending with the coarsest filler. The crosslinking agent B was added and moderate stirring (150 revolutions/minute) was applied for 10 minutes. The catalyst D was added and stirring was continued for 1 minute. $D_3$ was then added, and stirring was continued for 1 minute at atmospheric pressure and then 5 minutes under reduced pressure until an absolute pressure of approximately 3 kPa was attained. After degassing, nitrogen was introduced into the apparatus up to atmospheric pressure and the fluid composition was poured into cartridges which were impervious to atmospheric moisture.

Measurements of Physical Properties

These were carried out according to the techniques set forth in Example 1 above. The nature of the various ingredients of the compositions, their concentrations and the physical properties of the compositions are reported in Table II below. The pourability measurement was replaced by the measurement of the composition viscosity in mPa.s at 25° C.

From Table III, it will be seen that the compositions of Examples 8, 9 and 10 have similar physical properties. However, the composition of Comparative Example 9 exhibited a nonadhesive feel time which was too long.

TABLE III

| Examples | 8 | 9 | 10 |
|---|---|---|---|
| $A_2$ parts by weight | 100 | 100 | 100 |
| $C_1$ parts by weight | 7 | 7 | 7 |
| $C_3$ parts by weight | 50 | 50 | 50 |
| $C_4$ parts by weight | 3 | 3 | 3 |
| $B_1$ parts by weight | 4 | 4 | 4 |
| $B_2$ parts by weight | 4 | 4 | 4 |
| $D_2$ parts by weight | 0 | 0 | 00.5 |
| $D_3$ parts by weight | 2 | 2 | 2 |
| $D_4$ parts by weight | 0.05 | 0 | 0.05 |
| Viscosity (mPa.s) | 30,000 | 30,000 | 22,000 |
| t (minute) | 30 | 45 | 30 |
| Accelerated aging | normal | normal | normal |
| Shore A hardness | 40 | 42 | 45 |
| A.M 100% (MPa) | 1.1 | 1.2 | 1.9 |
| T/S (MPa) | 3.6 | 3.6 | 3.6 |
| E/B % | 200 | 200 | 170 |

EXAMPLES 11, 12 AND COMPARATIVE EXAMPLES 13, 14 AND 15

Pouring composition with hydroxylated phenylated oil.

Preparation and measurement of physical properties

The operation was carried out as in Example 9 and oil F was added at the same time as oil A.

The results obtained are reported in Table IV below.

From Table IV, it will be seen that the composition with hydroxylamine, but without aminated silane, in Comparative Example 13, exhibited a nonadhesive feel time which was much too long.

TABLE IV

| Examples | 11 | 12 | 13 | 14 | 15 |
|---|---|---|---|---|---|
| $A_2$ parts by weight | 100 | 100 | 100 | 100 | 100 |
| $C_2$ parts by weight | 9 | 4 | 8 | 4 | 4 |
| $B_1$ parts by weight | 3 | 3 | 3 | 3 | 3 |
| $B_2$ parts by weight | 3 | 3 | 3 | 3 | 3 |
| $F_1$ parts by weight | 5 | 5 | 5 | 5 | 5 |
| $D_1$ parts by weight | 0 | 0 | 0 | 0.1 | 0.1 |
| $D_3$ parts by weight | 1 | 1 | 0 | 1 | 1 |
| $D_4$ parts by weight | 0.05 | 0.05 | 0.05 | 0 | 0 |
| Viscosity (mPa.s) | 23,000 | 7,000 | 15,000 | 5,000 | — |
| Pourability (min) | — | — | — | — | 90 |
| t (minutes) | 60 | 60 | 240 | 30 | 75 |
| Accelerated aging | normal | normal | normal | normal | normal |
| Shore A hardness | 27 | 20 | 24 | 21 | 21 |
| T.M 100% (MPa) | 0.54 | 0.34 | 0.44 | 0.32 | 0.5 |
| T/S (MPa) | 0.97 | 0.5 | 0.88 | 0.49 | 0.66 |
| E/B % | 190 | 145 | 235 | 170 | 145 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition of matter that is stable in storage in the absence of moisture and curable into elastomeric state in the presence of moisture, devoid of any organometallic curing catalyst, and which comprises (A) an α,ω-dihydroxydiorganopolysiloxane polymer, (B) a ketiminoxysilane crosslinking agent, (C) inorganic filler material; (D) an organofunctional silane other than the ketiminoxysilane claimed as component (B) and (E) a substituted hydroxylamine.

2. The organopolysiloxane composition as defined by claim 1, which comprises:

(A) 100 parts by weight of at least one α,ω-dihydroxydiorganopolysiloxane polymer having a viscosity of 700 to 1,000,000 mPa.s at 25° C., comprising diorganosiloxy recurring units of the formula $R_2SiO$, in which the radicals R, which may be identical or different, are hydrocarbon radicals having from 1 to 10 carbon atoms, at least 50% of the number of such radicals R being methyl radicals;

(B) 0.5 to 20 parts by weight of at least one crosslinking agent comprising at least one ketiminoxysilane;

(C) 1 to 250 parts by weight of an inorganic filler material;

(D) 0.1 to 10 parts by weight of an organofunctional silane of the formula:

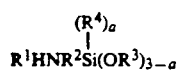  (1)

in which $R^1$ is a hydrogen atom, an alkyl radical having from 1 to 6 carbon atoms, inclusive, or an aliphatic hydrocarbon radical bonded via a carbon bond to the nitrogen atom and containing at least one primary amime group, $R^2$ is a divalent hydrocarbon radical having from 1 to 6 carbon atoms, optionally containing an ether functional group, $R^3$ is an alkyl or alkoxyalkyl radical having less than 8 carbon atoms, $R^4$ is a monovalent hydrocarbon radical having from 1 to 6 carbon atoms, a phenyl radical or a vinyl radical, and a is 0 or 1;

(E) 0.001 to 1 part by weight of a hydroxylamine of the formula:

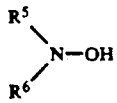  (2)

in which the radical $R^5$ is a saturated or unsaturated, aliphatic or cycloaliphatic, monovalent hydrocarbon, or aryl, alkylaryl or arylalkyl radical, and the radical $R^6$ is a radical $R^5$ or a hydrogen atom, with the proviso that two of the radicals $R^5$ and $R^6$ may together form a divalent radical including an O, N or Si heteroatom and having from 2 to 6 carbon atoms.

3. The organopolysiloxane composition as defined by claim 2, further comprising:

(F) 1 to 15 parts by weight of at least one oil of the formula:

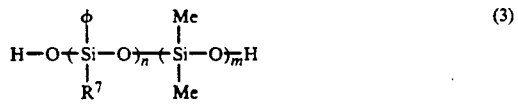  (3)

in which φ is a phenyl radical, Me is a methyl radical, $R^7$ is a methyl or phenyl radical, n is an integer ranging from 2 to 100, and m is an integer ranging from 0 to 100, with the proviso that n and m are such that the viscosity of the oil at 25° C. ranges from 50 to 100,000 mPa.s.

4. The organopolysiloxane composition as defined by claim 2, said inorganic filler material comprising 1 to 50 parts by weight of precipitated and/or pyrogenic silica treated with an organosilicon compound.

5. The organopolysiloxane composition as defined by claim 2, said hydroxylamine (E) comprising N-dimethylhydroxylamine, N-diethylhydroxylamine, N-dibutylhydroxylamine, N-methyl-N-phenylhydroxylamine or N-diphenylhydroxylamine.

6. The organopolysiloxane composition as defined by claim 2, said at least one ketiminoxysilane (B) having the formula:

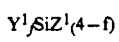

in which the symbol $Y^1$ is a $C_1$-$C_{10}$ hydrocarbon radical or a substituted such radical bearing at least one halogen atom or cyano group substituent, the symbols $Z^1$, which may be identical or different, are each a hydrolyzable radical having one of the formulae:

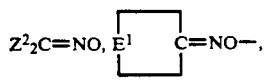

in which the symbols $Z^2$, which may be identical or different, are $C_1$-$C_8$ hydrocarbon radicals, and the symbol $E^1$ is a $C_4$-$C_8$ alkylene radical, and the symbol f is zero or one.

7. The organopolysiloxane composition as defined by claim 6, said at least one ketiminoxysilane (B) comprising vinyltris(methyl ethyl ketoxime)silane, $(CH_2=CH)Si[ON=C(CH_3)(C_2H_5)]_3$; methyltris(methyl ethyl ketoxime)silane, $CH_3Si[ON=C(CH_3)(C_2H_5)]_3$; tetrakis(dimethyl ketoxime)silane, $Si[ON=C(CH_3)_2]_4$; tetrakis(methyl ethyl ketoxime)silane, $Si[ON=C(C_2H_5)(CH_3)]_4$; or mixture thereof.

8. The organopolysiloxane composition as defined by claim 2, said aminofunctional silane (D) comprising $(C_2H_5O)_3Si(CH_2)_3NH_2$, τ-aminopropyltriethoxysilane; $(CH_3O)_3Si(CH_2)_3NH_2$; τ-aminopropyltrimethoxysilane; or $(CH_3O)_3Si(CH_2)_3NH(CH_2)_2NH_2$, β-aminoethyl-τ-aminopropyltrimethoxysilane.

9. The organopolysiloxane composition as defined by claim 2, dispersed in an organic solvent therefor.

* * * * *